Jan. 5, 1971  D. W. DANIEL  3,553,095

METHOD AND APPARATUS FOR ECM GEAR FINISHING

Filed Dec. 18, 1967  2 Sheets-Sheet 1

INVENTOR
DAVID W. DANIEL

BY Whittemore,
Hulbert & Belknap

ATTORNEYS

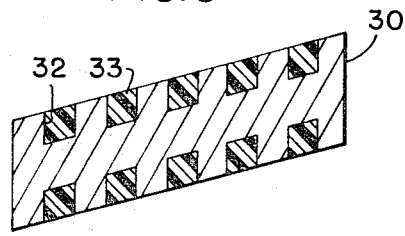
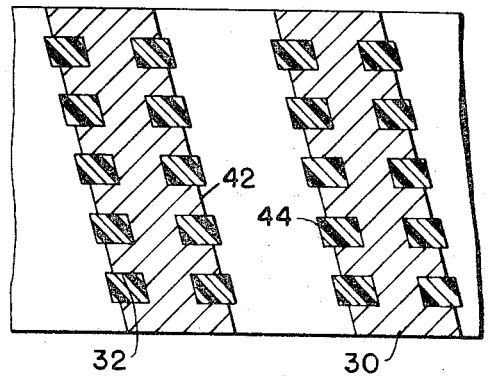
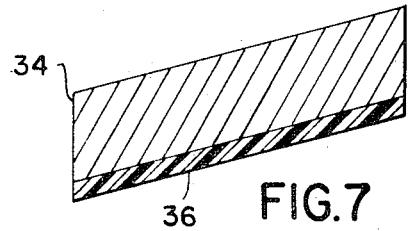
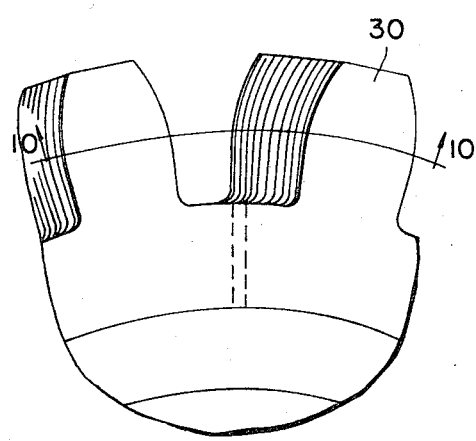
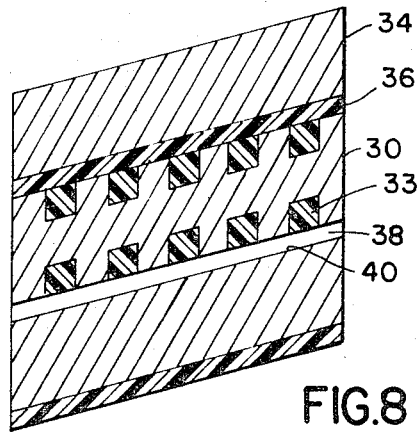
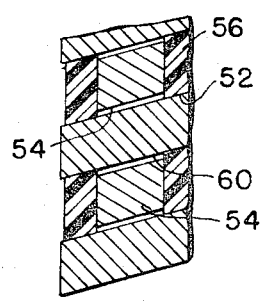

United States Patent Office 3,553,095
Patented Jan. 5, 1971

3,553,095
METHOD AND APPARATUS FOR ECM GEAR FINISHING
David W. Daniel, Birmingham, Mich., assignor, by mesne assignments, to Lear Siegler, Inc., Santa Monica, Calif., a corporation of Delaware
Filed Dec. 18, 1967, Ser. No. 691,341
Int. Cl. C23b 5/68
U.S. Cl. 204—212
9 Claims

ABSTRACT OF THE DISCLOSURE

Method and apparatus for finishing gears by running the gear in mesh with a gearlike finishing tool having teeth provided with electrically conducting side surface portions, maintaining the conducting side surface portions of the tool teeth spaced from the adjacent tooth surfaces of the gear, providing a flow of electrolyte in the spaces substantially enclosed between the meshing teeth of the gear and tool, and passing a flow of direct electrical current between the teeth of the gear and tool. The apparatus includes means for limiting the flow of electrolyte to the zone of mesh between the gear and tool, tools of special form for carrying out the method, and a novel method of producing the tools by ECM.

BACKGROUND OF THE INVENTION

Electrochemical machining commonly known as ECM, has been applied to many machining operations but heretofore it has not proved feasible to employ ECM in the finishing of gear teeth in an operation in which a tool constituting one electrode and being in the form of a gear, is rotated in mesh but out of contact with the teeth of a work gear. The advantages of employing the tool in a rotating meshed relationship are in the improvement of tooth spacing and in the generating action automatically obtained by rotating the parts in mesh.

SUMMARY OF THE INVENTION

In accordance with the present invention a tool in the form of a gear having teeth provided with electrically conducting side surfaces is rotated in tight mesh with a metal work gear. Means are provided for maintaining the conducting surface portions of the teeth of the tool in substantially predetermined constant spaced relationship to the adjacent tooth surfaces of the gear. This means may conveniently take the form of ribs of nonconducting material which may or may not contain abrasive, and which project above the conducting surface portions of the teeth of the tool by a predetermined amount, such for example as a few thousandths of an inch. In this operation the gear and tool are preferably rotated on parallel axes, and so that the ECM may be effective on all surface portions of the gear teeth, the insulating ribs may be provided on the teeth of the gear in a staggered relationship, or preferably disposed at a slight lead so that as each work gear tooth is exposed in a predetermined sequence to different teeth of the tool, all surfaces of the gear tooth will be substantially uniformly exposed to the ECM.

Alternatively, the spacing between the conducting portions of the tool teeth and the adjacent surface portions of the gear teeth may be provided by an insulating gearlike member located at one side of the work gear with its teeth in alignment with the teeth of the work gear. In this case the teeth of the insulating member have a slightly greater chordal thickness than the teeth of the gear so as to maintain the required space relationship as aforesaid.

In order to provide the required flow of electrolyte in a manner which permits it to perform its usual function in ECM, an annular channel is provided at one or both sides of the tool and generally radial passages communicate between the channel and the space between the roots of the teeth of the tool. In order to limit the flow of electrolyte to the zone of action, a closure and sealing plate is provided overlying the portion of the channel adjacent the zone of mesh, the plate having plugs extending into the channel to close off a relatively short arcuate space directly adjacent the zone of mesh. The plate or plates are supported by stationary means so that as the tool rotates, fluid in the channel is confined to the zone adjacent the zone of mesh.

Means are provided for establishing a direct current flow of electricity between the gear and tool in the required direction to remove material from the surfaces of the teeth of the gear, this material being carried away by the flow of electrolyte. Where the spacing between the teeth of the gear and tool is maintained by a multiplicity of ribs on the teeth of the tool, these ribs may if desired contain fine abrasive so as to continuously remove the ash from the surfaces of the teeth of the gear in a manner which is known in electrolytic grinding.

The invention further comprises a novel method of producing the tool having a multiplicity of upstanding insulating ribs which space electrically conducting portions of the teeth of the tool from the adjacent tooth portions of the work gear. According to one embodiment of this aspect of the invention, the teeth of the tool are provided with serrations in the required staggered or helically disposed patterns and these serrations are filled with insulating material such for example as epoxy resin, which may if desired contain a small amount of very finely divided abrasive particles. This tool body is then placed in mesh with a metal gearlike electrode and means such for example as an insulating gearlike member located at one side of either the tool blank or the gearlike electrode, is employed to maintain a predetermined spacing between the confronting metal surfaces of the teeth. Either the tool blank or the gearlike electrode is provided with means for furnishing a flow of electrolyte as described in the foregoing, and direct current is passed across the space through the electrolyte in a direction to remove metal from the tool blank in the spaces between adjacent deposits of insulating material. This operation is carried on until the metal portions of the tool blank have been removed to a depth sufficient to provide upstanding insulating ribs which function to maintain the metal tooth surfaces of the tool in properly spaced relationship from the teeth of a work gear in subsequent use of the tool.

Alternatively, the required space relation between the gearlike tool blank and a gearlike electrode may be provided by forming an insulating coating of predetermined thickness on corresponding sides of all teeth of the electrode and by driving the gear and electrode in such a way as to maintain contact between the teeth of the tool blank and the coated surfaces of the teeth of the gearlike electrode.

The objects of the invention are to provide the method and apparatus as described in the foregoing.

Other objects and features of the invention will become apparent as the description proceeds, especially when taken in conjunction with the accompanying drawings, illustrating preferred embodiments of the invention.

BRIEF DESCRIPTION OF THE DRAWINGS

FIG. 6 is a developed sectional view through a tooth of a tool blank during its manufacture.

FIG. 7 is a similar developed sectional view of the tooth of a gearlike electrode employed in producing the finishing tools of the present invention.

FIG. 8 is a developed sectional view between meshing teeth of the tool blank having teeth of the type shown in FIG. 6, and a gearlike electrode having teeth of the type shown in FIG. 7.

FIG. 9 is a fragmentary end view of a tool for carrying out ECM on the teeth of a work gear.

FIG. 10 is a fragmentary sectional view of the structure shown in FIG. 9, taken on the line 10—10, and developed into a plane.

FIG. 12 is a fragmentary developed sectional view showing the relationship between the teeth of a tool and work gear for finishing the teeth of the gear by ECM, or for producing a tool having teeth of the type disclosed in FIGS. 9 and 10.

DESCRIPTION OF THE PREFERRED EMBODIMENTS

ECM involves the removal of metal from a metal surface by passing direct electrical current from the surface to an electrode through a liquid electrolyte. The electrolyte may be a water solution of various materials including common salt. Preferably, the electrolyte is furnished under relatively high pressure and with a relatively large volumetric flow. The metal particles separated from the surface of the workpiece by the flow of electrical current are in general carried away by the electrolyte so that the tooth surfaces of the tool or electrode do not undergo appreciable deterioration.

Electrolytic grinding has in common with ECM the dislodgement of particles by a flow of direct current from a workpiece to a grinding wheel through a suitably provided electrolyte, with the added feature that the grinding wheel makes light contact with the workpiece. It is generally supposed that perhaps 90% of the material removed from the workpiece is the result of the flow of electric current and that the principal function of the mechanical contact between the grinding wheel and the surface of the workpiece is to keep the surface clean and to remove from it the ash left as a result of the purely electrical action. Where a flow of electrolyte adequate both as to pressure and velocity can be maintained there is probably little advantage in having the mechanical contact characteristic of electrolytic grinding.

In accordance with one aspect of the present invention however, mechanical contact with the surface of the gear teeth being machined by ECM is inherent and accordingly, this contact may be taken advantage of to remove ash or the like as in electrolytic grinding.

The removal of material from the teeth of a work gear G by ECM involves rotating the gear on its axis in tight mesh with a gearlike tool T having teeth which in general are conjugate to the teeth of the work gear. As the tool and gear are rotated in mesh there will normally be something equivalent to a hunting-tooth arrangement so that each tooth of the work gears is during the operation engaged in each tooth space, or at least in most tooth spaces of the tool. Means are provided for connecting the gear and tool in an electrical circuit and this means is diagrammatically illustrated in FIG. 1 as including contacts at 10 for connection to a suitable source of direct current. The flow of current is in a direction such as to cause material to be dislodged from the surfaces of the teeth of the gear and to move toward the teeth of the tool. However, electrolyte flowing in the spaces maintained between the teeth of the gear and tool in general carries these particles away and prevents deposit on the teeth of the tool.

Figure 2:
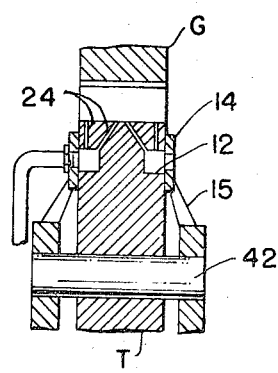
FIG. 2 is a sectional view on the line 2—2, FIG. 1.
Figure 3:
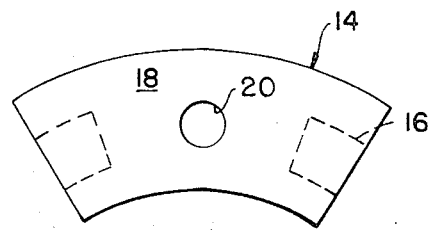
FIG. 3 is an elevational view of a fluid isolating plate.
Figure 5:
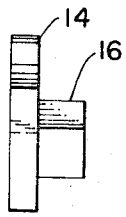
FIG. 5 is an end view of the plate shown in FIG. 3.
Figure 4:
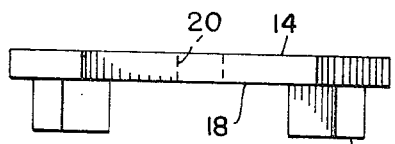
FIG. 4 is a plan view of the plate shown in FIG. 3.

In order to provide electrolyte in the spaces which are maintained between the adjacent surface portions of the teeth of the gear and tool, the tool T is provided with an annular channel 12 at one side thereof, or preferably with similar channels at opposite sides thereof as illustrated in FIG. 2. Associated with each of these channels where two are provided, or with the single channel if only one is provided, is a fluid isolating plate 14 adapted to close the outer side of the channel throughout a zone adjacent the zone of mesh between the teeth of the gear and tool. The isolating plate has lugs 16 projecting into the channel 12 so as to isolate an arcuate portion thereof as aforesaid. The isolated plates 14 are supported in fixed position on the machine by fixed supports 15. The plate 14 includes a flat wall portion 18 overlying the channel 12 and is provided with a circular opening 20 for connection to a source of electrolyte under pressure.

Preferably, the plates 14 are dimensioned so as to extend substantially to the tops of the tool teeth 22 so as to prevent the escape of electrolyte at the ends of the teeth. With this arrangement the electrolyte is effectively trapped in the space substantially defined by the zones of contact of the meshing teeth and the root spaces between the gear and tool. The flow of electrolyte is thus in general required to take place through the predetermined spacing which is maintained between the conducting surface portions of the teeth of the tool and the adjacent tooth surfaces of the work gear.

A multiplicity of generally radially extending passages 24 communicate between the arcuate grooves or channels 12 and the root surfaces between the teeth 22 of the tool T.

Preferably, the fluid isolating plates 14 are formed of insulating material. If desired, the plates or wall portions 18 and the lugs 16 may be provided with seals although some leakage of electrolyte is not particularly objectionable. In any case, the electrolyte escaping from the spaces between the teeth of the gear and tool is simply collected and returned to a tank for recirculation. In other words, it is not essential that anything approaching fluidtight conditions exist between the fluid isolating plates 14 and the tool T.

It is essential in order that the operation as so far described shall carry out ECM to maintain a reasonably constant spacing between conducting surface portions of the teeth of the tool and adjacent tooth surfaces of the work gear. This may be accomplished in general in two ways, in one of which spacing ribs of insulating material are provided on the teeth of the tool, and in the other of which an insulating tooth spacer is positioned at one side of the work gear so as to maintain the required clearance or spacing.

Referring now to FIGS. 6, 7 and 8, there is illustrated a method of producing a tool having insulating ribs provided on its tooth surfaces. In order to produce a tool of this type, a metal gear is formed having teeth 30 one of which is illustrated in longitudinal section in FIG. 6. This tooth, it will be observed, is the tooth of a helical gearlike member. The sides of the teeth are provided with grooves or serrations 32 in much the same manner as such serrations are provided in a gear shaving cutter. The production of these serrations is well known to those familiar with the art of gear finishing and will not be described in detail. In accordance with the present invention these grooves or serrations 32 are packed full of a suitable insulating material such for example as an epoxy resin which may be of the type employed in the production of gear honing tools as disclosed in Praeg et al. Pat. 2,913,858. At this time the insulating material 33, which may or may not contain relatively fine abrasive particles, fills the grooves or serrations 32 completely full so that the side surfaces of the teeth 30 are smooth surfaces in the form of involute helicoids.

Figure 1:
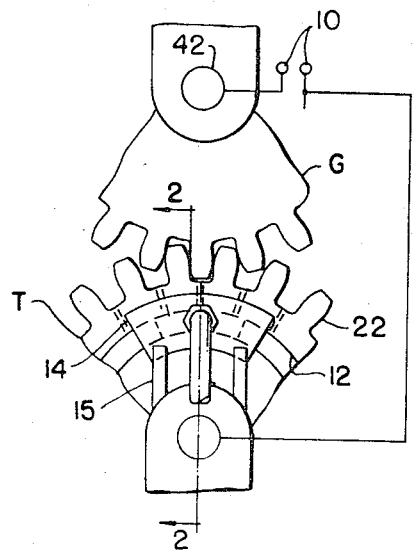
FIG. 1 is a fragmentary elevational view showing the meshing relationship between a work gear and a tool for carrying out ECM on the surfaces of the teeth of the gear.

For the production of the gear finishing tool from the blank as processed above, there is provided a gearlike tool or electrode having teeth 34 formed of metal which are provided at one side with a uniform coating 36 of insulating material which may be in the form of epoxy resin. The teeth are dimensioned so that the coated teeth of the gearlike electrode, as shown at 34 in FIG. 7, have a substantial clearance with respect to the teeth 30 of the gearlike tool blank. When the tool blank and gearlike electrode are meshed the relationship between the teeth thereof becomes as illustrated in FIG. 8. It will be observed that at this time with the blank and electrode in loose mesh there is a clearance or space 38 between one side of the tool blank tooth 30 and the adjacent metal surface 40 of the tooth of the gearlike electrode. Either the tool blank having the teeth 30 or the gearlike electrode having the teeth 34 is provided with one or more arcuate channels such as the channel 12 of FIG. 2, which communicate through passages 24 with the root spaces thereof, and the parts are rotated in mesh on suitable support means 42 as shown in FIG. 1. The parts are electrically connected in the same manner as the tool and work gear disclosed in FIGS. 1 and 2, and current is passed across the space 38 so as to remove metal intermediate the insulation packed channels 12 to a predetermined depth. This operation is repeated with the other side of the teeth 30 suitably spaced from the metal surface of the gearlike electrode. When completed the teeth of the tool are as shown in FIGS. 9 and 10, each tooth 30 having insulating material remaining in the serrations 32 but now extending above the reduced electrically conducting surface portions 42 to define insulating ribs 44. It will be appreciated that the ribs 44 are provided in identical form at both sides of the teeth of the tool so that the gear and tool, as seen in FIG. 1, may be maintained in tight mesh with light pressure contact at both sides of the teeth, while the electrically conducting portions of the tooth surfaces thereof are maintained in predetermined spaced relationship by the insulating ribs 44.

It is a recognized characteristic of gear tooth action that as each tooth passes through the zone of mesh contact on that tooth with the adjacent tooth of the gearlike member passes from the crest of the tooth to the root of the tooth or vice versa depending upon the direction of rotation. The contact between meshing teeth is generally a line contact which in the case of spur gears extends parallel to the axis of the gears, and which in the case of helical gears extends obliquely to the axis. At either side of the theoretical line of contact the spacing increases at first gradually and then more rapidly. In order to produce the most desirable form of gear finishing by ECM it is desirable to at least concentrate the metal removal on the zone adjacent to the line which would be the theoretical line of contact except for the predetermined spacing maintained between conducting surfaces of the teeth. For this purpose it is desirable to employ an electrolyte which imposes appreciable resistance to the flow of electric current so that the flow of electric current is concentrated along the narrow zone of closest approach between the teeth of the gear and tool. This zone shifts from root to crest or from crest to root of the teeth in a manner which will result in a desirable removal of metal. It will be understood that otherwise metal removal would take place throughout the entire portion of the work gear tooth which is exposed to electrolyte trapped in the space between adjacent teeth of the gear and tool. This would result in excessive removal of material adjacent the roots of the teeth and insufficient removal of material adjacent the crests of the teeth.

The problem of profile change due to the variable area of the gear tooth surface exposed to electrolytic action can be further minimized by reversing rotation of the gear and gearlike electrodes so as to have substantial equal periods of ECM while rotating in each direction.

An electrolyte which fulfills the requirements as aforesaid is a solution of ordinary salt.

Figure 11:
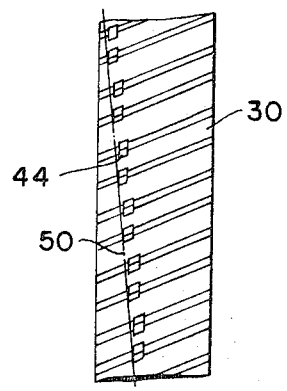
FIG. 11 is a diagrammatic developed view showing the arrangement of insulating ribs on successive teeth of a tool in a helical disposition.

As previously stated, in order to insure uniform removal of material from the surfaces of the gear teeth despite the presence of the insulating ribs 44 on the teeth of the tool, these ribs are disposed in a predetermined pattern as suggested in FIG. 11 where the ribs 44 on each tooth 30 are not in circumferential alignment but instead, are disposed on a lead or helix as indicated by the construction line 50. This arrangement will insure that all areas of the tooth surfaces of the work gear are substantially equally exposed to ECM during a finishing operation.

Referring now to FIG. 12 there is illustrated a somewhat simplified manner of maintaining the required spatial relationship between adjacent tooth portions of a gear and tool. In this figure, which may be considered as a fragmentary developed sectional view through adjacent teeth of a gear and tool, there is shown metal teeth 52 of a tool which operate in mesh with an assembly of a work gear having teeth 54 and insulating spacer gears having teeth 56. The teeth 56 of the spacer gears are in end alignment with the teeth 54 of the work gear. While these teeth are shown as in end abutment in FIG. 12, this relationship need not exist and the teeth may be slightly spaced endwise. In any case, the spacer gear having the teeth 56 is fixed to the work gear having the teeth 54 so that when the teeth 56 are in tight mesh with the teeth 52 of the gear finishing tool, the teeth 54 of the work gear maintain a predetermined spacing as illustrated at 60 with the teeth of the tool.

Since the teeth 52 of the tool extend endwise beyond the ends of the teeth 54 of the work gear, it will be apparent that the teeth of the work gear are uniformly finished from end to end.

Since the machining operation does not depend upon a cutting action, the speed of rotation of the parts is not particularly important so long as the speed is not too great to permit the provision of an adequate flow of electrolyte into the spaces substantially closed by the adjacent portions of the teeth of the gear and tool and the end closures constituted by the fluid isolating plates 14. In addition, it must be borne in mind that this substantially enclosed space varies in volume as the teeth of one of the gearlike members moves in mesh through the zone of action. Accordingly, the speed of rotation should be selected in accordance with the permissible volumetric flow of electrolyte so that there is at all times an adequate substantially radially outward flow of electrolyte across the active zone determined by the area of closest approach or minimum spacing between the teeth. It will also be necessary to take into account the fact that this volume or enclosed space is of decreasing volume during approach. During this phase of the operation there may be a full reverse flow of electrolyte through the passages 24 but in any case, a predetermined pressure will be maintained on the electrolyte which will result in the required generally radially outward flow of electrolyte both during the arc of approach and separation of each gear tooth.

The voltage of the direct current applied to the tools may be moderate as for example, approximately 10 volts, and may result in a relatively large current flow as for example, about 200 amperes.

What I claim as my invention is:

1. Apparatus for finishing a work gear for ECM which comprises
   a work spindle for supporting a metallic work gear,
   a metal tool gear adapted to mesh with a work gear on the work spindle,
   a tool spindle for supporting said tool gear for rotation,
   means for driving one of said spindles in rotation, the other spindle being freely rotatable.

said tool gear having fluid passages therein having ports in the bottoms of the spaces between its teeth through which electrolyte may flow, means connecting said passages to a source of liquid electrolyte under pressure to provide a continuous flow of electrolyte, means for controlling rotation of said spindles to provide substantially constant spacing between conducting portions of the sides of the teeth of said tool gear and the adjacent surfaces of a work gear on said work spindle, and means for connecting said tool gear and work spindle into a direct current electrical circuit.

2. Apparatus as defined in claim 1, comprising means for closing the ends of the spaces between said tool gear teeth so as to require the flow of electrolyte to comprise a substantial flow generally radially outward of said tool gear teeth past the zone of minimum spacing between the teeth of said tool gear and a work gear in mesh therewith.

3. Apparatus as defined in claim 1 in which the means for supplying electrolyte comprises an annular channel at a side of said tool gear, a fluid isolating plate carried in fixed position by said support overlying the portions of said channel corresponding to the zone of mesh of the teeth of said tool gear, said plate having lugs extending into said channel to isolate a short portion thereof adjacent said zone of mesh, said passages in said tool gear extending between said channel and each root space between the teeth thereof.

4. Apparatus as defined in claim 3, said isolating plate extending radially outward substantially to the crests of the tool gear teeth, and a plate similar to said isolating plate at the opposite side of said tool gear closing the ends of its tooth spaces throughout the zone of mesh.

5. Apparatus as defined in claim 1 in which the means for maintaining the conducting portions of the teeth of said tool gear at a substantially constant minimum spacing from the teeth of a work gear comprises an insulating spacer gear on said work spindle having teeth in longitudinal alignment with the teeth of the work gear and in tight mesh with the teeth of the tool gear, the spacer gear teeth having a slightly greater chordal thickness than the teeth of the work gear.

6. Apparatus as defined in claim 1 in which the teeth of the tool gear are provided with ribs of insulating material of small substantially uniform height above the surfaces of the teeth, and each rib extending continuously from root to crest of the teeth.

7. Apparatus as defined in claim 6, said tool teeth having grooves extending from root to crest thereof, insulating material in said grooves, said ribs being extensions of the insulating material in said grooves.

8. Apparatus as defined in claim 7, said ribs containing fine abrasive particles.

9. Apparatus as defined in claim 6, said ribs being formed so that the series of most nearly circumferentially aligned ribs extends at a helix around said tool gear.

References Cited

UNITED STATES PATENTS

| 3,329,596 | 7/1967 | Abt et al. | 204—224 |
| 3,257,300 | 6/1966 | Williams | 204—224 |
| 3,046,206 | 7/1962 | Johnson et al. | |

JOHN H. MACK, Primary Examiner

S. S. KANTER, Assistant Examiner

U.S. Cl. X.R.

204—143, 224